United States Patent [19]
Lombardo

[11] Patent Number: 5,947,033
[45] Date of Patent: Sep. 7, 1999

[54] SEATCOVER WITH TRAY

[76] Inventor: Jeff B. Lombardo, 3430 Mason Dr., Pahrump, Nev. 89048-2310

[21] Appl. No.: 09/184,942

[22] Filed: Nov. 3, 1998

[51] Int. Cl.⁶ .................................................. A47B 23/00
[52] U.S. Cl. ...................... 108/44; 297/188.04; 297/163
[58] Field of Search ................................. 108/43, 44, 45; 297/188.04, 188.06, 163; 224/275

[56] References Cited

U.S. PATENT DOCUMENTS

| | | | |
|---|---|---|---|
| D. 343,326 | 1/1994 | Bruce . | |
| 1,742,822 | 1/1930 | Olson | 224/275 |
| 2,249,287 | 7/1941 | Gearhart et al. | 108/44 X |
| 2,697,479 | 12/1954 | Fesler | 224/275 |
| 2,798,780 | 7/1957 | Motorney . | |
| 2,932,544 | 4/1960 | Lambert | 108/44 X |
| 3,164,109 | 1/1965 | Atkinson | 108/44 |
| 3,207,567 | 9/1965 | Brady . | |
| 3,479,085 | 11/1969 | Weinstein | 297/188.06 X |
| 4,676,548 | 6/1987 | Bradbury | 297/188.04 X |
| 4,725,094 | 2/1988 | Greer | 297/188.06 X |
| 4,942,827 | 7/1990 | Norgaard . | |
| 5,046,433 | 9/1991 | Kramer et al. . | |
| 5,443,018 | 8/1995 | Cromwell . | |
| 5,558,026 | 9/1996 | Seibert | 108/44 |
| 5,878,672 | 3/1999 | Ostermann et al. | 108/44 |

*Primary Examiner*—Jose V. Chen

[57] ABSTRACT

A tray for accommodating eating, reading, and writing activities for a passenger seated in a transport vehicle, and a seat cover supporting the tray on a seat back of a seat of the transport vehicle. The seat cover has a plurality of connectors enabling the tray to be manually connected to the seat cover and thereby supported. The tray has a flat floor, a peripheral wall, and two receptacles for supporting cups or bowls. Two hooks project forwardly from the tray, for engaging two of the connectors. Two support struts are pivotally journalled respectively to right and left sides of the tray. The free ends of the two struts are received in two of four connectors of the seat cover. Each of these four connectors has a socket for receiving a strut. Four different ways of connecting the tray to the seat cover are thus provided, each one way resulting in inclination of the tray relative to the seat cover which differs from the other possible inclinations. The four possible inclinations range from horizontal to vertical, with two intermediate inclinations.

9 Claims, 4 Drawing Sheets

SEATCOVER WITH TRAY

BACKGROUND OF THE INVENTION

1. Field of the Invention

The present invention relates to a seat or seatcover adapted to support a rigid tray in any of several positions. Most applicable to motor vehicles, the seat cover envelops the back of a seat of furniture or of transport vehicles. The tray projects preferably to the rear of the seat back.

2. Description of the Prior Art

People traveling in motor vehicles are frequently constrained to remain in the vehicle for prolonged periods of time. It is frequently desirable to engage in activities such as reading, writing, and eating. Amenities for conducting such activities are limited. The prior art has suggested various schemes for mounting trays to seats of motor vehicles in order to perform these activities.

U.S. Pat. No. 5,046,433, issued to Randall Kramer et al. on Sep. 10, 1991, and U.S. Pat. No. 5,443,018, issued to Carl E. Cromwell on Aug. 22, 1995, each illustrates a tray suspended from the seat back of the seat of a motor vehicle. However, the method of suspending the tray in both examples varies from that of the present invention. Notably, both Kramer et al. and Cromwell employ straps passing over the seat and engaging a headrest. Neither of these patents shows hooks projecting from the tray in combination with support struts which engage sockets or receptacles anchored in a seat cover, these features being present in the present invention.

None of the above inventions and patents, taken either singly or in combination, is seen to describe the instant invention as claimed.

SUMMARY OF THE INVENTION

The present invention provides a tray and a seat cover bearing support receptacles for supporting the tray in any of several angles of inclination relative to the seat back on which the seat cover is placed. The seat cover enables the tray to be mounted to the seat without being required to have structure cooperating with any particular seat configuration, while simultaneously protecting the surface of the seat from dirt, wear, and other injurious influences.

Of the support receptacles, two are disposed at relatively high positions on the seat cover. These upper receptacles, one on the right and one on the left, each have two bars for engaging hooks projecting from the tray. The hooks selectively engage one bar on each upper receptacle. Therefore, two possible mounting positions are available for mounting the tray at the upper support receptacles.

Four support receptacles are mounted on the seat cover on each of the right and left sides, well below the upper support receptacles. On each right or left side, one lower support receptacle is at a relatively higher location and the other at a relatively lower location. Support struts pivotally fixed to the tray can be selectively inserted into either of the upper or lower support receptacles, thereby offering an additional two mounting positions. Any combination of hook and support strut locations may be selected, so that the tray may be adjusted to any of four possible adjustments of inclination.

At one end of the range of adjustment, the tray is horizontal, as would be appropriate for supporting dishes and other articles which are employed when eating a meal. At the other end of the range of adjustment, the tray approaches a steep or even vertical orientation, which is appropriate for supporting books and other reading materials. Two intermediate orientations are also provided. The tray is readily removed from the seat cover if the former is not desired, since there is no permanent or positive attachment of tray to seat cover. Gravity alone secures the tray to the seat cover. The receptacles are configured to provide secure mounting to prevent inadvertent disengagement of hooks or struts, should the vehicle encounter bumps along the road.

The tray is configured to accommodate both eating and general purpose usages. It has a flat floor bounded by a short upstanding peripheral wall to retain spillage and to prevent small articles from rolling off the tray. Two receptacles for retaining cups or bowls are provided. A ledge formed on one lateral edge of the tray supports a book or the like when the tray is vertically oriented.

Accordingly, it is one object of the invention to provide a tray mountable to the rear side of a seat of a transport vehicle, for supporting diverse articles.

It is another object of the invention that the tray be adjustable as to inclination relative to the seat.

It is a further object of the invention that the tray be suitable for accommodating eating, reading, and writing activities.

An additional object of the invention is to provide a seat cover capable of accommodating mounting of a tray thereon.

Still another object of the invention is that the tray be readily separable from the seat cover.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
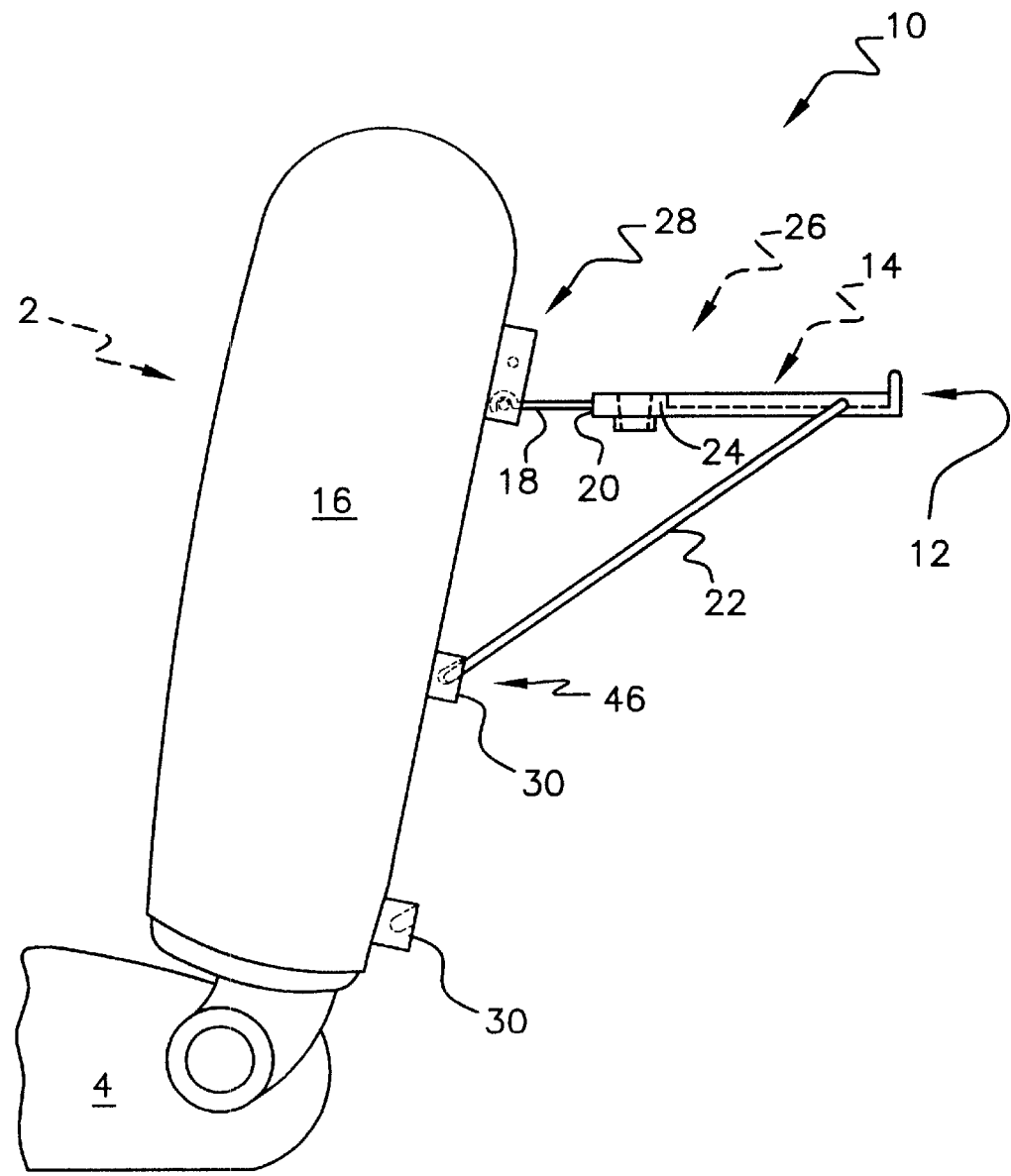
FIG. 1 is an environmental, side elevational view of the invention.

Turning now to FIG. 1 of the drawings, novel tray 10 is shown mounted to a seat back 2 of a seat 4 of a transport vehicle (not shown in its entirety). Tray 10 is usable for accommodating eating, reading, writing and other activities. Tray 10 includes a working platform 12 having a flat support surface 14 (upwardly facing, but concealed in the view of FIG. 1) for supporting diverse articles (not shown) placed thereon during an activity conducted by a person seated in a seat (not shown) located behind seat 4. This arrangement is typical of transport vehicles (not shown) such as aircraft, trains, and the like, wherein seats are arranged in serial order in long rows.

Platform 12 is supported in any one of several selectable positions on seat back 2 by connection to anchorage elements disposed on seat cover 16, which has been placed over and is supported on seat back 2. Seat cover 16 may be of any suitable construction enabling it to engage seat back 2. Seat cover 16 could comprise a sheath fully enclosing the lateral sides and top of seat 4. It could also comprise the outermost fabric or other surface of seat 4, as would occur if the invention were incorporated into seat 4 during manufacture. Two hooks 18 arranged abreast of one another, so that only one is visible in the side elevation of FIG. 1, project from the forward edge 20 of platform 12. Two struts 22 (only one visible in FIG. 1), arranged abreast of one another, project from lateral edges 24, 26 of platform 12. Hooks 18 engage first anchorage elements 28, and struts 22 engage second anchorage elements 30. It will be understood that just as there are two hooks 18 and two struts 22, there are correspondingly two first anchorage elements 28 and second anchorage elements 30 for each shown in FIG. 1, there being one respective anchorage element 28 or 30 concealed behind that shown in FIG. 1. Second anchorage elements 30 are disposed in vertically arrayed, spaced apart locations, so that each support strut 22 is selectively inserted and received in any one of several second anchorage elements 30. Thus there are two first anchorage elements 28 and four anchorage elements 30 attached to seat cover 16.

Figure 2:
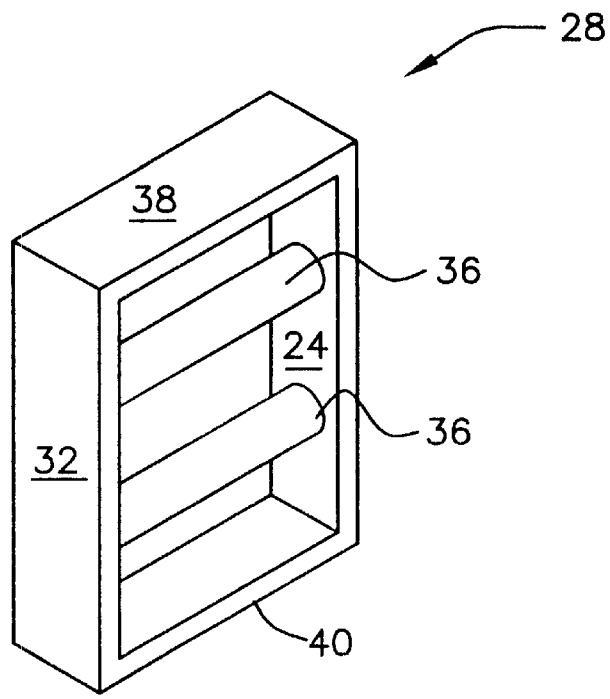
FIGS. 2 and 3 are, respectively, perspective detail views of components of FIG. 1.

FIG. 2 shows a representative first anchorage element 28 in detail. Anchorage element 28 comprises two spaced apart walls 32, 34 and a plurality of bars 36 connected to and spanning walls 32, 34. Each bar 36 is spaced apart from any neighboring bar sufficiently to enable a hook 18 selectively to engage any one selected bar 36. Therefore, two mounting positions are available for each hook 18 within any one anchorage element 28. Of course, anchorage element 28 could include three or even more bars 36, as may be desired. Similarly, more than one anchorage element 28 may be provided. A selection of anchorage elements 28 and 30 could be employed, for example, to change mounting height, but not inclination, of working platform 12. Upper and lower walls 38, 40 are provided to brace walls 32, 34, and are spaced apart from bars 36 so as not to interfere with insertion and engagement of hooks 18 with any bar 36.

Figure 3:
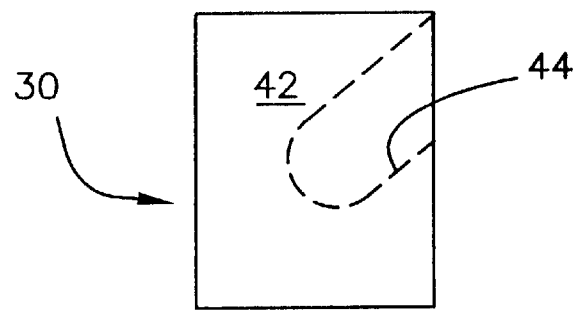

FIG. 3 illustrates a representative second anchorage element 30. Anchorage element 30 comprises a body 42 having a socket 44 dimensioned and configured to receive the free end 46 (see FIG. 1) of a strut 22. Any suitable detachable manual connector may be substituted for anchorage element 30, as the latter is shown and described. Also, more anchorage elements 30 may be provided where desired to offer additional mounting positions for platform 12. Anchorage elements 28, 30 are located on seat cover 16 such that walls 32, 34 of element 28 and sockets 44 of elements 30 project rearwardly from seat cover 16 towards platform 12. When both hooks 18 and struts 22 engage their respective anchorage elements 28 or 30 as shown in FIG. 1, platform 12 is supported in a fixed, selected position on seat back 2.

Anchorage elements 28, 30 are suitably fixed to seat cover 16 so as to accommodate platform 12 and a reasonable amount of weight which may be supported by platform 12 without allowing platform 12 to disengage from seat cover 16 or to change inclination relative to seat back 2 to any significant extent. Similarly, seat cover 16 is constructed so as to incorporate sufficient bracing to achieve similar stability.

Figure 4:
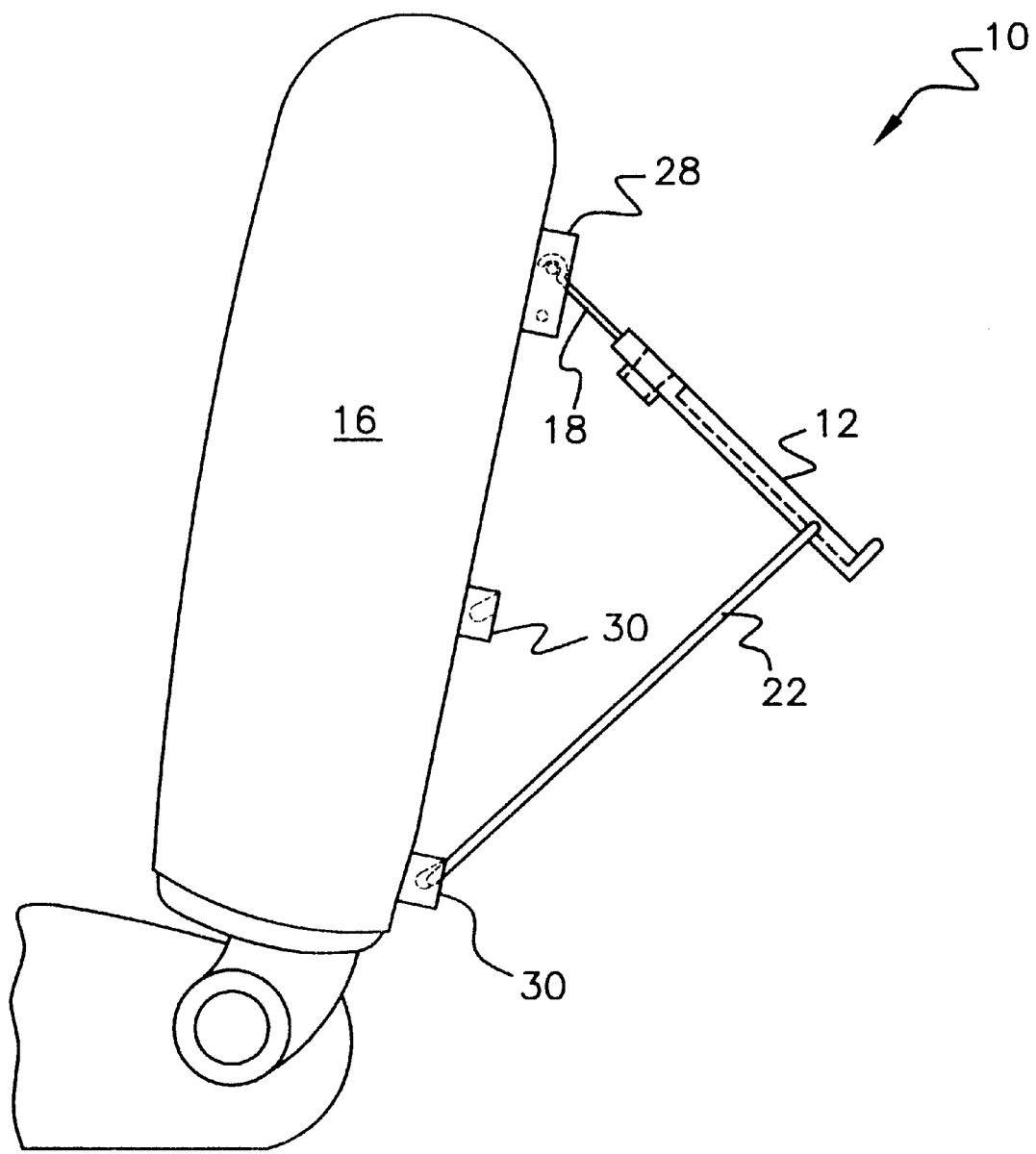
FIG. 4 is similar to FIG. 1, but shows an alternative position of the invention.

In the elevated position shown in FIG. 1, platform 12 is horizontal, as would be appropriate for eating. FIG. 4 shows an alternative position of platform 12, wherein platform 12 is supported at a steep inclination which would be appropriate for supporting a book, a flat electronic screen, or other device (none shown) in a suitable position for reading, writing, drawing, and pressing control buttons for entering data and commands. To achieve the position shown in FIG. 4, hooks 18 and struts 22 have been moved from their anchorage points illustrated in FIG. 1. It would be possible to change the mounting positions of only hooks 18 or of only struts 22 to achieve the other two possible mountings of platform 12 to seat cover 16.

It will be appreciated that hooks 18 and corresponding anchorage elements 28 are merely representative of many types of manual, detachable connectors which could be employed to connect working platform 12 to seat 4. Illustratively, hook and loop material and other fasteners could replace the hook arrangement described herein. Similarly, second anchorage elements 30 could be other than sockets. Any structure detachably engaging and retaining struts 22 could be substituted for sockets 44.

Figure 5:
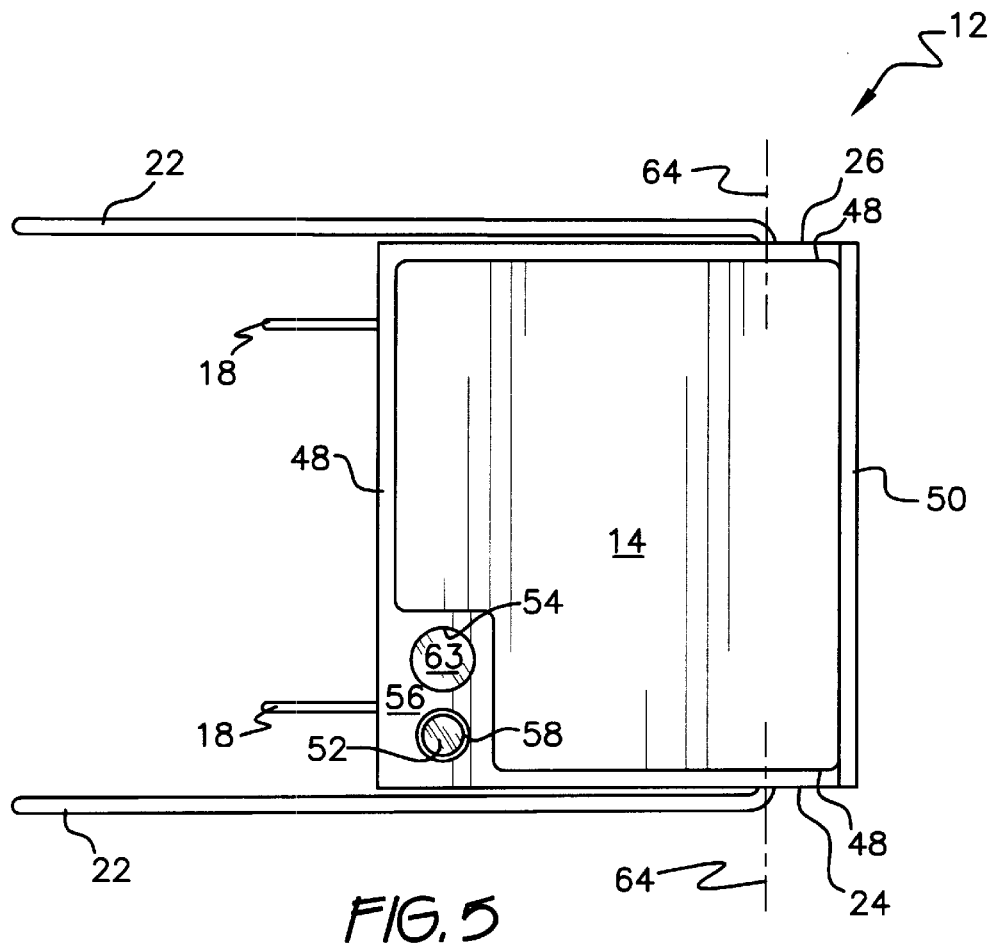
FIG. 5 is a top plan view of a component of FIG. 1.
Figure 6:
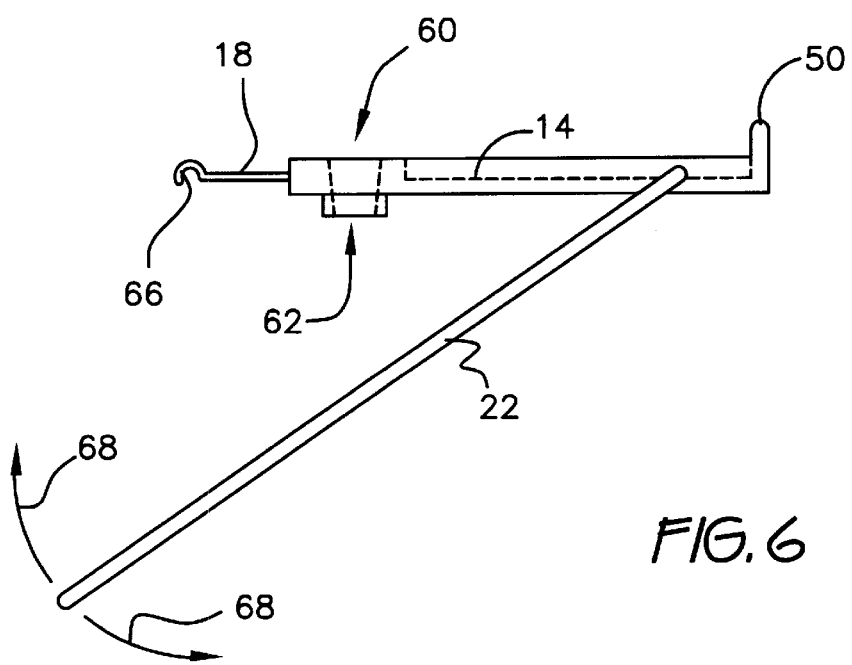
FIG. 6 is a side elevational view of the component shown in FIG. 5.

FIGS. 5 and 6 show features of platform 12. Platform 12 has a short, upstanding wall 48 projecting from support surface 14 at forward edge 20 and lateral edges 24, 26 of platform 12. Wall 48 is taller at rear edge 50 of platform 12 than at forward edge 20 and lateral edges 24, 26, thereby forming a ledge 50 for supporting books and other articles (none shown) when platform 12 is disposed at a steep inclination relative to seat cover 16, such as that shown in FIG. 4. Height of ledge 50 is clearly shown in FIG. 6.

Working platform 12 has first and second vessel receptacles 52, 54 formed in a raised portion 56 thereof. Receptacle 52 has an inclined lateral wall 58 open at the top 60 and at the bottom 62, for receiving drinking cups and the like (not shown) having inclined walls. Receptacle 54 has a floor 63, so that small articles not cooperating closely with dimensions and configuration of receptacle 54 can be supported therein.

Support struts 22 are journalled within platform 12, or alternatively have other pivotal attachment elements such that they swivel relative to platform 12. Swivel is indicated by arrows 68 in FIG. 6. Preferably, struts 22 are arranged such that they pivot about a common rotational axis 64. Axis 64 is disposed from the left lateral edge 24 of platform 12 to right lateral edge 26 of platform 12, and parallel to surface 14.

Each hook 18 opens downwardly. That is bent portion 66 of each hook 18 points downwardly when platform 12 is horizontal and when surface 14 is oriented upwardly, as illustrated in FIG. 6.

It is to be understood that the present invention is not limited to the embodiments described above, but encompasses any and all embodiments within the scope of the following claims.

I claim:

1. A tray usable for accommodating eating, reading, and writing activities and mountable to a seat back of a seat of a transport vehicle, comprising:

a working platform having
a flat support surface, a forward edge, a rear edge, and lateral edges, and a short, upstanding wall projecting from said flat support surface at said forward edge, said rear edge, and said lateral edges of said working platform,
attachment means for manually and detachably attaching said working platform to a supporting object, said attachment means fixed to said working platform, support struts projecting from said working platform, said support struts having pivotal attachment elements enabling each said support strut to swivel relative to said working platform; and a seat cover disposed to engage the seat back of the seat of the transport vehicle, said seat cover having a right side, a left side, first anchorage elements disposed to engage said attachment means for attaching said working platform, and second anchorage elements including engagement members disposed to removably receive and retain said support struts.

2. The tray according to claim 1, wherein said first anchorage elements comprise two spaced apart walls disposed to project from said seat cover towards said working platform, and a bar connected to and spanning said two spaced apart walls.

3. The tray according to claim 1, wherein attachment means comprise hooks, and said first anchorage elements comprise two spaced apart walls disposed to project from said seat cover towards said working platform, and a plurality of bars connected to and spanning said two spaced apart walls, each said bar being spaced apart from all other said bars sufficiently to enable said hooks selectively to engage any one said bar.

4. The tray according to claim 1, wherein said support struts are two in number, and four said second anchorage elements are provided, there being two said second anchorage elements disposed at said right side of said seat cover in vertically arrayed, spaced apart locations, and two said second anchorage elements disposed at said left side of said seat cover in vertically arrayed, spaced apart locations, whereby each support strut is selectively received in more than one said second anchorage element.

5. The tray according to claim 1, wherein said working platform has a first vessel receptacle having an inclined lateral wall open at the top and at the bottom.

6. The tray according to claim 1, wherein said working platform has a second vessel receptacle having a floor.

7. The tray according to claim 1, wherein said attachment means are two in number and each said hook opens downwardly, and said support struts are two in number, wherein one said support strut is disposed at one said lateral edge of said working platform and the other said support strut is disposed at an opposed said lateral edge of said working platform.

8. The tray according to claim 1, wherein said short, upstanding wall is taller at said rear edge of said working platform than at said forward edge and at said lateral edges of said working platform, thereby forming a ledge for supporting books when said tray is disposed at a steep inclination relative to said seat cover.

9. A tray usable for accommodating eating, reading, and writing activities and mountable to a seat back of a seat of a transport vehicle, comprising:

a working platform having a flat support surface, a forward edge, a rear edge, and lateral edges, a first vessel receptacle and a second vessel receptacle both disposed in said working platform, said first vessel receptacle having an inclined wall and being open at the bottom and at the top, said second vessel receptacle having a floor, and a short, upstanding wall projecting from said flat support surface at said forward edge, said rear edge, and said lateral edges of said working platform, wherein said short, upstanding wall is taller at said rear edge than at said forward edge and said lateral edges of said working platform, thereby forming a ledge for supporting books when said tray is disposed at a steep inclination relative to said seat cover, two downwardly open hooks projecting from said forward edge of said working platform, and two support struts projecting from said working platform, said support struts having pivotal attachment elements enabling each said support strut to swivel relative to said working platform, wherein one said support strut is located at one said lateral edge of said working platform and the other said support strut is located at an opposed said lateral edge of said working platform; and a seat cover disposed to engage the seat back of the seat of the transport vehicle, said seat cover having a right side, a left side, two first anchorage elements disposed to engage said hooks, wherein each one of said first anchorage elements comprises two spaced apart walls disposed to project from said seat cover towards said working platform, and four second anchorage elements, there being two said second anchorage elements disposed at said right side of said seat cover in vertically arrayed, spaced apart locations, and two said second anchorage elements disposed at said left side of said seat cover in vertically arrayed, spaced apart locations, each one of said second anchorage elements including a socket disposed to receive said support struts, and a plurality of bars connected to and spanning said two spaced apart walls, wherein said bars are spaced apart from one another sufficiently to enable a said hook to engage any one said bar.

* * * * *